United States Patent [19]

Cannon

[11] 3,778,011

[45] Dec. 11, 1973

[54] HELICOPTER CARGO POD

[76] Inventor: Corbitt Thomas Cannon, 109 Daniel St., Arnprior, Ontario, Canada

[22] Filed: Jan. 11, 1972

[21] Appl. No.: 216,961

[30] Foreign Application Priority Data
Nov. 9, 1971 Canada .............................. 127,210

[52] U.S. Cl. .... 244/137 R, 224/42.41, 224/42.42 R, 244/17.11
[51] Int. Cl. ............................................ B64d 9/00
[58] Field of Search .................. 224/42.42 R, 29 R, 224/42.32, 42.41; 244/17.11, 17.17, 118 R, 137 R, 137 A, 129 R, 118 P, 135 R, 135 A; 9/14

[56] References Cited
UNITED STATES PATENTS

| | | | |
|---|---|---|---|
| 1,488,720 | 4/1924 | Tichy et al. ............... | 224/42.41 UX |
| 1,473,319 | 11/1923 | Ray .................................. | 224/42.32 |
| 2,553,207 | 5/1951 | Peltier .............................. | 244/118 R |

*Primary Examiner*—Gerald M. Forlenza
*Assistant Examiner*—Jerold M. Forsberg
*Attorney*—Robert I. Dennison et al.

[57] ABSTRACT

A cargo pod suitable for attachment to a passenger helicopter comprises: a faired housing forming an elongated box; a contoured inward side to the housing, shaped to fit closely at least round its edges to a part of a helicopter fuselage which lies at the sides of the helicopter and immediately below access doors of the helicopter; a reinforced upper part of that housing, forming a step arranged to carry the weight of passengers using said access doors; and attachment means by which said housing can be firmly secured to, and supported by, the helicopter fuselage.

4 Claims, 7 Drawing Figures

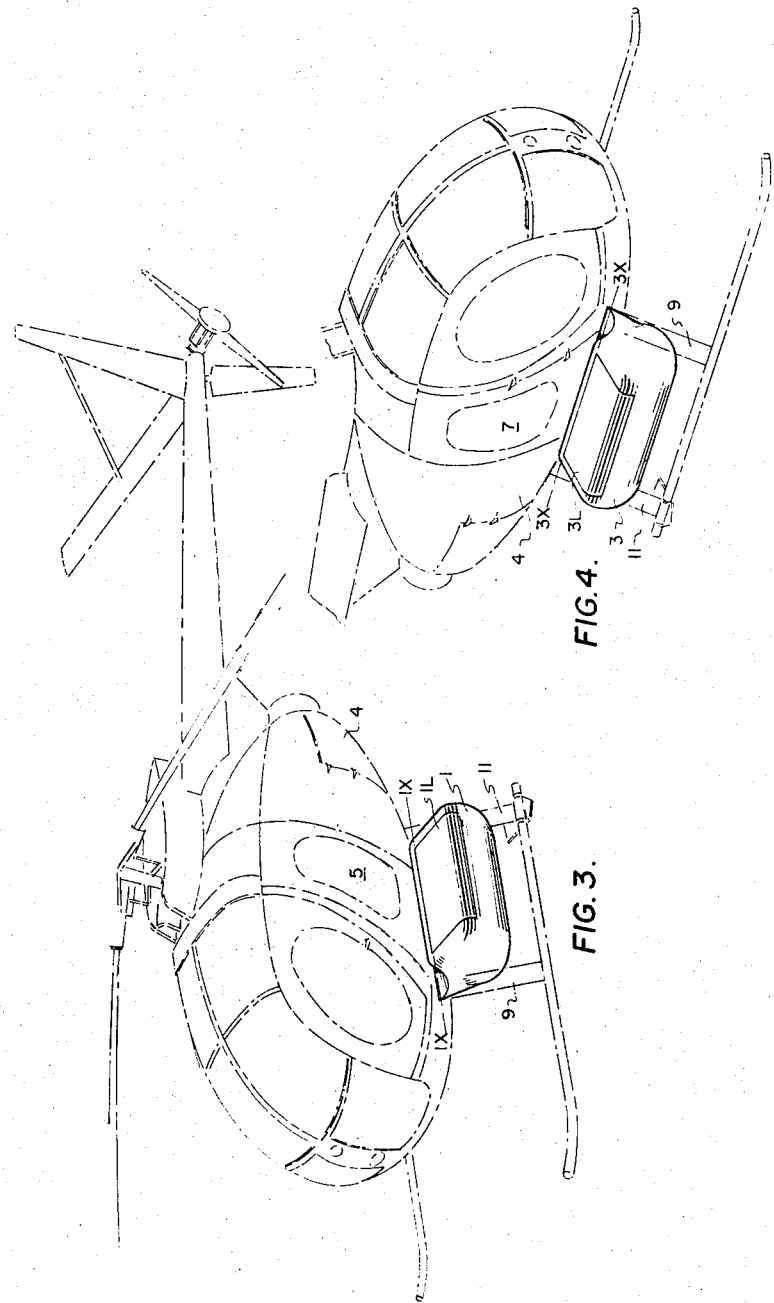

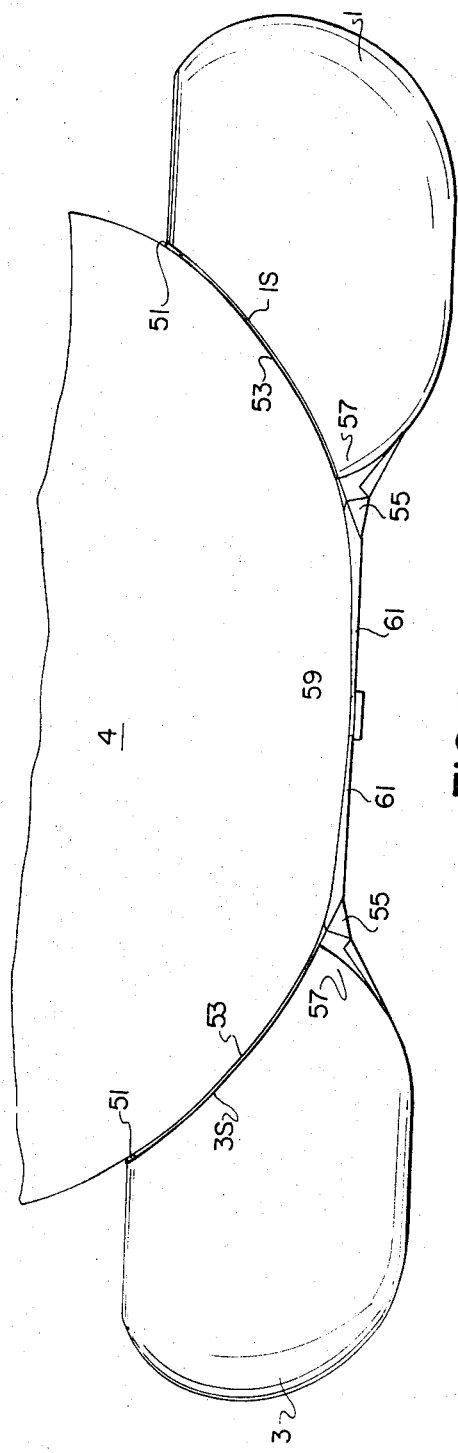

HELICOPTER CARGO POD

This invention relates generally to cargo carrying pods for helicopters.

One large class of helicopter is the small passenger carrying helicopter, such as for example the five seater Hughes 500 helicopter. Although helicopters are available for carrying large loads, helicopters in this small passenger carrying class have no cargo compartment, and any cargo must be carried in the rear seat area. This is a disadvantage, primarily because the presence of articles in the rear seat area makes it uncomfortable, if not impossible, to carry passengers at the same time.

The problem has been studied by the manufacturers of such helicopters, and they provide as optional extras for these helicopters pods which can be fitted underneath the helicopter between the port and starboard landing gear. However, such pods have not proved successful. They have proved expensive to make and sell, and they have proved awkward to fit into place and remove, it being necessary for a crewman to crawl under the helicopter to fit the pod in place and to release it.

An onject of the present invention is the provision of an improved cargo pod for small passenger helicopters.

According to the present invention, a cargo pod suitable for attachment to a passenger helicopter comprises: a faired housing forming an elongated box; a contoured inward side to the housing, shaped to fit closely at least round its edges to a part of a helicopter fuselage which lies at the sides of the helicopter and immediately below access doors of the helicopter; a reinforced upper part of that housing, forming a step arranged to carry the weight of passengers using said access doors; support means at an upper portion of the housing for interengagement with the fuselage to support the weight of the housing and cargo carried thereby, and the wind loading on the housing, a resilient strip around the periphery of the contoured inward side for forming a seal between the housing and the fuselage, and clamping means arranged to act between the fuselage and a lower portion of the housing to draw the lower portion of the housing towards the fuselage and thereby to clamp the resilient strip.

The invention will now be described, by way of example, with reference to the accompanying drawings, in which:

FIGS. 3 and 4 are perspective three-quarter views of the helicopter shown in FIG. 2, and show more clearly the location of the port and starboard cargo pods respectively;

FIG. 5 is a front view of a lower part only of the helicopter, the landing gear being omitted, and shows the manner of securement of the pods;

Figure 2:
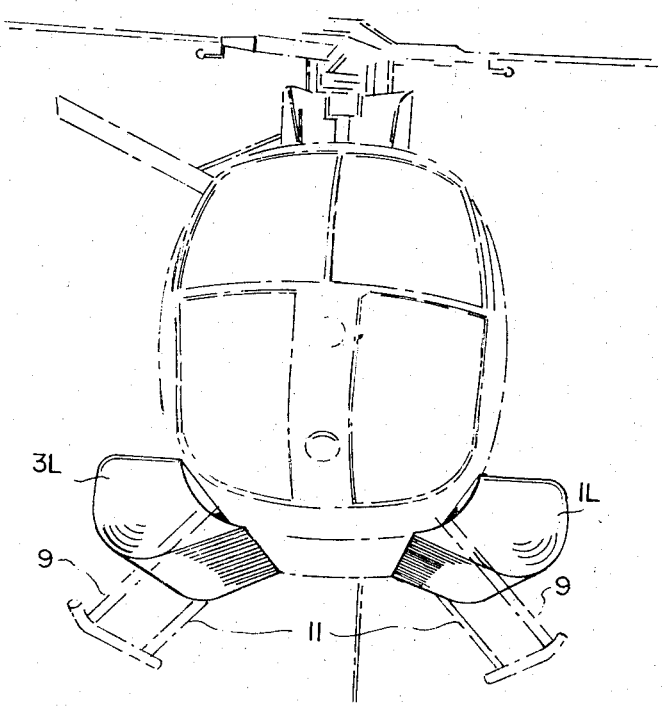
FIG. 2 is a perspective drawing of a small passenger helicopter, in chain dotted outline only, fitted with the pod shown in FIG. 1 and also with a matching starboard version of that pod.
Figure 1:
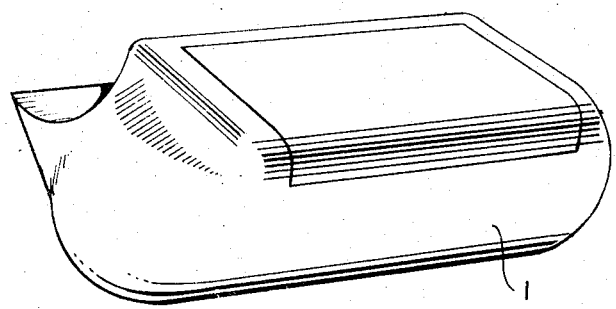
FIG. 1 is a perspective drawing of a cargo pod for the port side of a small passenger helicopter.

Referring first to FIGS. 2, 3 and 4, it will be seen that the port cargo pod 1 and the starboard cargo pod 3 are positioned at the sides of the helicopter 4, below the level of the port and starboard access doors 5 and 7 respectively, and that in this location each pod lies between the fore member 9 and the aft member 11 (the OLEO legs) of the landing gear.

Each pod is an approximation of a rectangular box, but its shape is faired and streamlined to reduce wind resistance when the helicopter is in forward flight, and so that an inner side 1S or 3S fits closely to the adjacent contour of the helicopter body. Because of this, it is necessary that the port cargo pod shall be a mirror image of the starboard cargo pod, so that the port and starboard pods are not interchangeable. However, in order to simplify manufacture, the inner side 1S or 3S may fit closely to the helicopter body only about its peripheral edge.

The top of each pod is provided with a lid 1L or 3L, and this lid is hinged along an axis 1X or 3X which is parallel to, but spaced outwardly of, the adjacent part of the helicopter body. As a result, when the lid is raised it clears the superjacent part of the helicopter body, and the lid can be raised to a vertical position to facilitate loading and unloading of the cargo pod. The outer side 15 of the lid extends downwardly for a short distance, so that rain water falling on the lid will not tend to seep into the pod, but will flow down over this curved outer side to fall free of the pod. It will be seen that the lid lies immediately below the associated door 5 or 7. The lid, like the remainder of the pod, is made of a synthetic material reinforced with glass fibres, suitably of the material sold under the trademark FIBREGLAS, but the lid is heavily reinforced so that it can safely take the weight of a passenger who uses it as a step in entering and leaving the helicopter. The provision of a step in this position is a great advantage, and makes it much easier for a passenger to board the helicopter. Further, the lid provides a useful platform for a mechanic when working on adjacent parts of the aircraft, and the lid is therefore engineered to take a substantial weight.

Since the pods are carried on the outside of the helicopter, it is important that they shall not seriously impair the flying characteristics of the aircraft. From the load carrying point of view, in the case of the Hughes 500 helicopter the available surplus lift is limited, and therefore the pods shown in the drawings were designated each to carry a maximum load of 250 pounds. The weight of the pair of pods is about 50 pounds, so that the total extra load when the pods are carrying their rated loads is about 550 pounds.

The detailed construction of the pods will be clear to those engaged in the art of moulding of articles of FIBREGLAS, and suitable reinforcing metal plates and bars or wires will be incorporated either to provide a general purpose pod, or to provide a pod to carry some specific load. It will be appreciated that although the pods are primarily intended for the transport of general cargo, they can be modified to provide housing for specific equipment such as magnetic survey equipment, and their detailed construction, and the materials used in that construction, may be dictated by the intended use of the pods. Stainless steel is the preferred reinforcing metal to be used.

Again, the exact manner of mounting the pod on the helicopter will depend upon the structural details of the helicopter involved. It has been found that the most effective way of mounting the pod is to provide a positive lug and lockpin, or like, connection along the top inner edge of the pod, for example, al or adjacent the location 51 in FIG. 5, to provide the pod with a soft rubber sealing strip 53 extending round the periphery of the part contoured to fit the helicopter fuselage, and to provide a coupling 55 connecting the lower inner edge 57 of the pod by a toggle lever operated geometric lock quick release and safety fastener to a bracket 59 mounted on the underside of the helicopter fuselage. This coupling holds the pod tightly against the fuselage, while the weight and wind loading on the pod is carried by the upper connection adjacent line 51.

Figure 6:
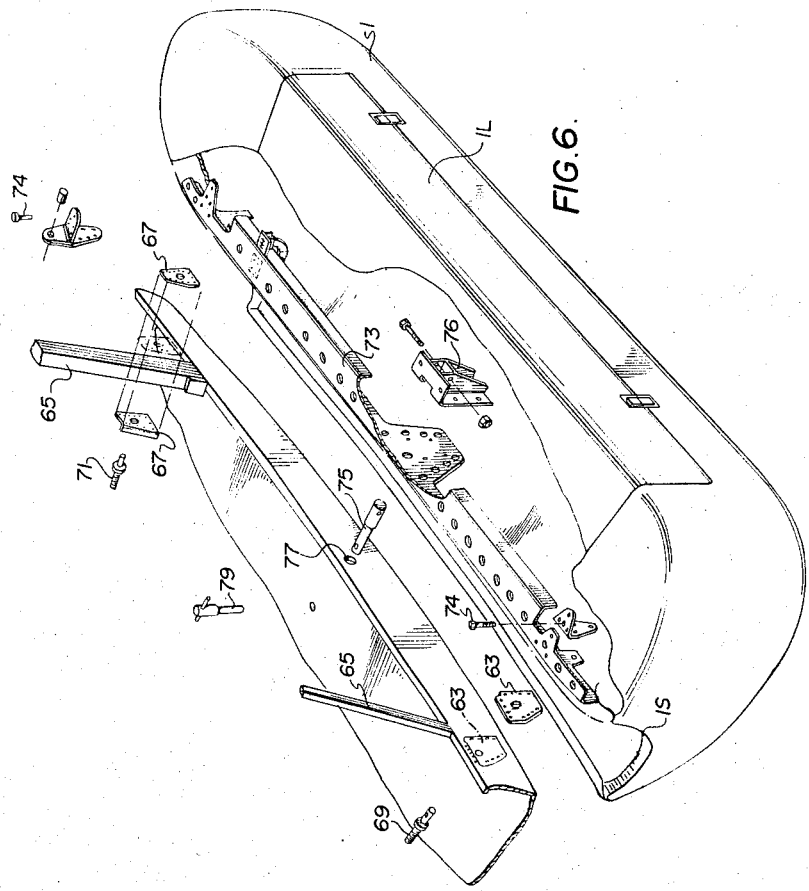
FIG. 6 is a schematic representation of the manner of attachment of the pod to the helicopter along an upper inner edge.
Figure 7:
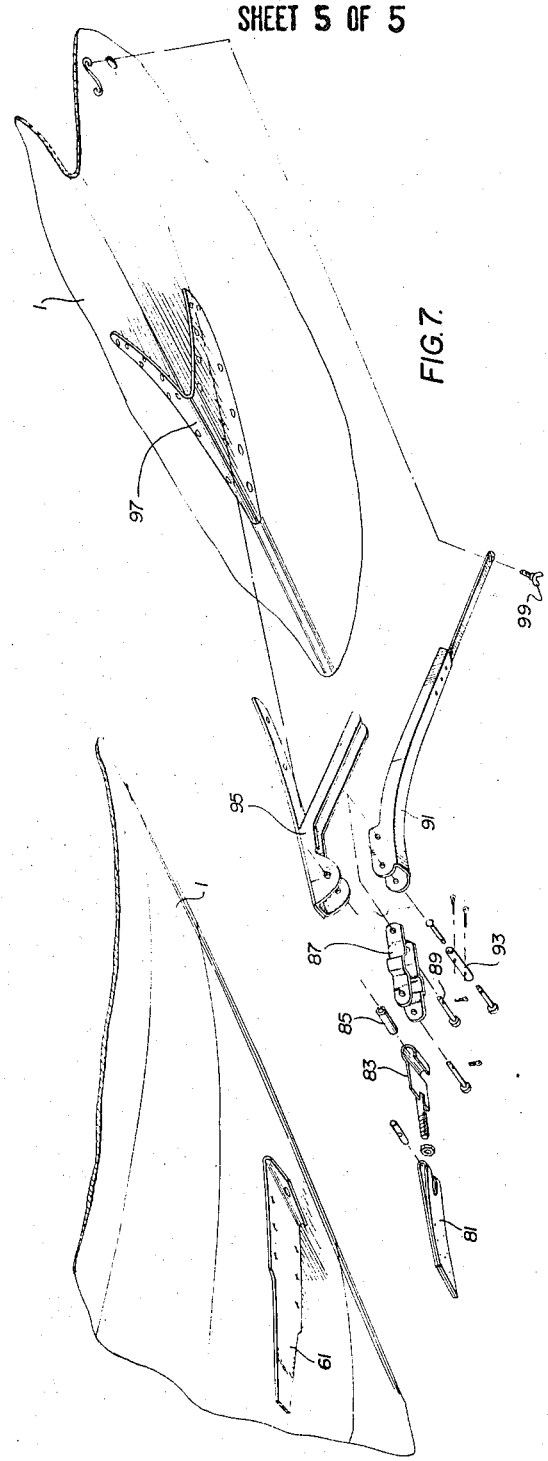
FIG. 7 is a schematic representation of the manner of clamping the lower part of the pod to the helicopter.

FIGS. 6 and 7 show in detail the items used to clamp the pod to the helicopter, but it is to be understood that these figures are included mainly as illustrative of how the invention can be applied to one particular helicopter, the Hughes 500. The construction shown may be modified where other helicopters are involved, since the objective is to make as little modification to the actual aircraft as possible.

In FIG. 5 the bracket 59 is indicated, and this is the standard cargo hook mounting plate provided on this particular helicopter, and the only change required in this structural area is the fitting of cross plate 61, which serves both pods 1 and 3, under bracket 50. As indicated in FIG. 6, two aligned plates 63 are secured to a forward part of door frame 65 of the helicopter, certain rivets being drilled out and replaced either with bolts or new rivets which use the same holes but now hold in place the plates 63. Similarly, two aligned plates 67 are secured to an aft part of the door frame. Stud bolts 69 and 71 are respectively fitted to plates 63 and 67 to provide two outwardly extending coupling studs for the pod, in this case pod 1. A rigid channel structural member 73 is integrally formed in the pod 1 during manufacture, and when the pod is in place, the outer ends of studs 69 and 71 extend through aligned holes in brackets attached to channel member 73, and are secured in place by quick release pins 74 fitted to them from outside the pod through small holes in the top of the pod. An outwardly extending lug or pin 75 is mounted on a bracket 76 carried by member 73, this pin extending inboard of the helicopter and providing the primary support for the pod. This pin 75 is inserted into an existing complementary hole 77 of the step support provided with this aircraft, and is locked in place with a vertical pin 79 provided with this aircraft.

To instal the pod on the aircraft, the lug or pin 75 is inserted into the step support hole 77 first, this being practical since the length of the free part of pin 79 is greater than that of the studs 69 and 71. Once the pin 75 is in hole 77 the pod is steadied and the two studs can be entered. Again, stud 69 is longer than stud 71, so that it can be entered next. Finally stud 71 is entered. With the pod firmly in place, the pins 74 and 79 are put in place.

Referring now to FIG. 7, cross plate 61 is coupled through a U-shaped strap 81, treaded barrel 82, and a hook 83 to a link roller 85 and thus through two latch links or side plates 87 and a clevis pin 89 to a latch handle 91 fulcrumed on a latch tube 93 to a bracket 95 bolted to a strengthening strip 97 integrally moulded in the pod 1. Tightening of the connection between bracket 59 (on the fuselage) and bracket 95 (on the pod) is effected by moving the latch handle 91 from a vertically downwards position to a position where it lies flat against the bracket 95. A turn fastener 99 is provided by which the latch handle can be held in its final position. The various parts of the linkage shown in FIG. 7 are adjusted during initial assembly so that, with latch handle 91 in its final position, the resilient sealing strip 53 is lightly compressed, between the housing and the fuselage and serves to mitigate transmission of vibration therebetween.

Once the hook 83 is properly adjusted, lightly to compress the sealing strip 53, no other adjustments are required. To release the lower part of the pod, the turn fastener 99 is released, the latch handle 91 is pushed down, and the link roller 85 drops out of hook 83. Most of the mechanism is thus removed with the pod. During installation, it is simple to engage link roller 85 in the hook 83, to tension the mechanism with the handle 91, and lock in place with the turn fastener 99.

The pods shown were constructed from polyester resin and glass cloth having a rectangular mesh to MIL-P-9400 specification No. 171. The lay-up for curved and flanged areas consisted of two layers of cloth thoroughly saturated with resin and built up to a finished thickness of 0.10 inch. Central sandwich and reinforced areas were built up of two layers of cloth as above, followed by integral bonding of pre-formed urethane rigid foam 0.35 inch thick, and finally covered by a third layer of cloth and resin, together with the necessary strengthening inserts and plates. As is usual in such work, all air pockets and bubbles are worked out during lay-up, and all tangential and intersecting surfaces are flared. The external surfaces were finished with a gloss polyurethane paint.

It will be seen that for the most part the means for mounting the pods are provided by existing hardware locations on the helicopter, so that few changes are required to the aircraft. By the use of fibreglass as the main material for the pods, little maintenance is required, and minor damage can be repaired by relatively unskilled work in the field.

Each pod can be mounted or dismounted in a very short time, in most instances in less than thirty seconds by a crew member working from the side of the helicopter, and the pods can be used whether the undercarriage in use consists of skids as shown, or of floats, and whether a high undercarriage or a low undercarriage is in use.

It is found that the pods have little effect on the performance of the helicopter. When floats are in use, the operating drag produced by the pods caused a speed reduction of about two miles per hour, and little change in the setting of flight controls, compared with normal operation, is required.

The pods shown have been found to be cheap to manufacture, easy to mount and use, of considerable assistance in improving the comfort of the passengers, and to produce little impairment in the operation of the aircraft.

It is clear that the cargo pod arrangement disclosed herein represents a distinct advance in the art which should benefit the industry generally.

I claim:

1. A cargo pod suitable for attachment to a passenger helicopter, and comprising:
   a. a faired housing forming an elongated box;
   b. a contoured inward side to the housing, shaped to fit closely at least around its edges to a part of a helicopter fuselage which lies at a side of the helicopter and immediately below access doors of the helicopter;

c. a reinforced upper part of that housing, formed to serve as a step to carry the weight of passengers using said access doors;

d. support means at an upper portion of said housing for interengagement with said fuselage to support the weight of said housing and cargo carried thereby and the wind loading on the housing;

e. a resilient strip around the periphery of said contoured inward side for forming a seal between the housing and the fuselage and inhibiting the transmission of vibration therebetween; and f. clamping means arranged to act between said fuselage and a lower portion of said housing to draw the lower portion of the housing towards said fuselage and thereby to compress said resilient strip.

2. A cargo pad as claimed in claim 1, wherein said clamping means comprise a connector for securing said lower part of said housing relative to said fuselage, and a toggle mechanism associated with said connector for effecting quick engagement and release of said connector.

3. In combination for attachment to a helicopter, a pair of cargo pods, each of said cargo pods comprising a faired housing forming an elongated box, a contoured inward side to the housing, shaped to fit closely at least around its edges to a part of a helicopter fuselage which lies at a side of the helicopter and immediately below access doors of the helicopter, a reinforced upper part of said housing, formed to serve as a step to carry the weight of passengers using said access doors, and support means at an upper portion of said housing for interengagement with said fuselage to support the weight of said housing and cargo carried thereby and the wind loading on the housing, each of said housing having a resilient strip around the periphery of said contoured inward side for forming a seal between said housing and said fuselage and inhibiting the transmission of vibration therebetween, a pair of connectors respectively provided on lower portions of said housings, said connectors being readily mutually interengageable to draw the lower portions of said housings towards the housing and thereby to compress the resilient strip.

4. The combination as claimed in claim 3, further comprising a quick release toggle mechanism for securing said connectors in mutual interengagement.

* * * * *